(12) United States Patent
Thorpe-Doubble

(10) Patent No.: US 8,857,783 B2
(45) Date of Patent: Oct. 14, 2014

(54) CEMENT BLOCK MOLD

(71) Applicant: Swail Developments Ltd., Chemainus (CA)

(72) Inventor: Steve Thorpe-Doubble, Chemainus (CA)

(73) Assignee: Swail Developments Ltd., Chemainus, British Columbia (CA)

( * ) Notice: Subject to any disclaimer, the term of this patent is extended or adjusted under 35 U.S.C. 154(b) by 0 days.

(21) Appl. No.: 13/904,275

(22) Filed: May 29, 2013

(65) Prior Publication Data

US 2013/0327919 A1 Dec. 12, 2013

(30) Foreign Application Priority Data

Jun. 6, 2012 (CA) ..................................... 2779790

(51) Int. Cl.
*B28B 7/06* (2006.01)
*B28B 7/20* (2006.01)
*B29C 39/00* (2006.01)
*B28B 7/34* (2006.01)
*B28B 7/00* (2006.01)

(52) U.S. Cl.
CPC .............. *B29C 39/003* (2013.01); *B28B 7/348* (2013.01); *B28B 7/06* (2013.01); *B28B 7/0079* (2013.01)
USPC ........... 249/101; 249/109; 249/120; 249/121; 249/126; 249/127; 249/135; 249/139; 249/154; 249/159; 249/164; 249/204

(58) Field of Classification Search
CPC ......... B28B 7/0079; B28B 7/06; B28B 7/20; B28B 7/348; B41B 11/52; E04B 1/168
USPC ............. 249/49, 53 M, 74, 76, 101, 109, 117, 249/120, 121, 126, 127, 134, 135, 136, 139, 249/154, 155, 156, 159, 162–165, 173, 249/204; 264/32, 333; 52/742.14; 405/257

See application file for complete search history.

(56) References Cited

U.S. PATENT DOCUMENTS

| | | | |
|---|---|---|---|
| 788,481 A | 4/1905 | Lightner | |
| 789,996 A | 5/1905 | McCullough | |
| 1,407,569 A * | 2/1922 | Pedersen | 249/146 |
| 2,694,847 A * | 11/1954 | Christiansen | 249/61 |
| 3,476,847 A * | 11/1969 | Drever et al. | 264/573 |
| 3,724,982 A * | 4/1973 | Davis | 425/117 |

(Continued)

FOREIGN PATENT DOCUMENTS

EP 4866 A1 * 10/1979 ................ B28B 7/18

*Primary Examiner* — Dimple Bodawala
(74) *Attorney, Agent, or Firm* — Davis & Bujold, PLLC; Michael J. Bujold

(57) ABSTRACT

A cement block mold which includes a base, a top cap and a flexible sidewall strip. The base has an upstanding peripheral sidewall with a single slotted engagement. The top cap has a downwardly extending peripheral sidewall with a single slotted engagement. The flexible sidewall strip having a first engagement at a first end and a second engagement at a second end. The sidewall strip is secured in position by bending the sidewall strip to form one of a circle or an oval, and then engaging the first engagement and the second engagement with the slotted engagement of the base, and then engaging the first engagement and the second engagement with the slotted engagement of the top cap.

5 Claims, 5 Drawing Sheets

(56) References Cited

U.S. PATENT DOCUMENTS

| | | | |
|---|---|---|---|
| 3,990,672 A * | 11/1976 | Buchanan | 249/48 |
| 4,161,208 A * | 7/1979 | Cooper | 164/244 |
| 5,183,095 A * | 2/1993 | Sullivan | 164/34 |
| 5,216,863 A * | 6/1993 | Nessa et al. | 52/439 |
| 6,736,365 B2 * | 5/2004 | Staskiewicz et al. | 249/100 |
| 7,556,752 B1 * | 7/2009 | Hicks | 264/32 |
| 8,083,203 B2 * | 12/2011 | Fournier | 249/48 |
| 8,281,545 B2 * | 10/2012 | Choi | 52/745.17 |
| 8,313,080 B2 * | 11/2012 | Fournier et al. | 249/48 |
| 8,485,493 B2 * | 7/2013 | Wells et al. | 249/48 |
| 2009/0108170 A1 * | 4/2009 | Penza | 249/48 |
| 2009/0178365 A1 * | 7/2009 | Anderson et al. | 52/742.14 |
| 2011/0012289 A1 * | 1/2011 | Kurakake et al. | 264/241 |
| 2011/0064841 A1 * | 3/2011 | Kurakake et al. | 425/548 |

\* cited by examiner

SECTION A-A

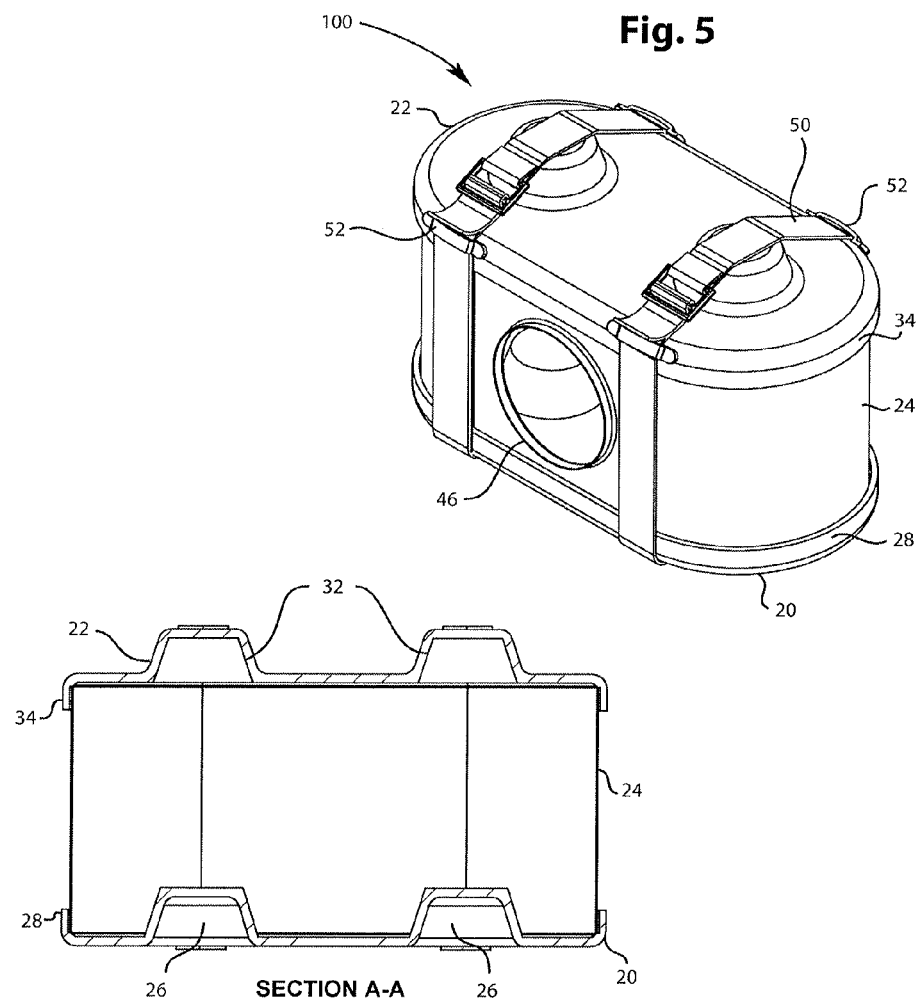
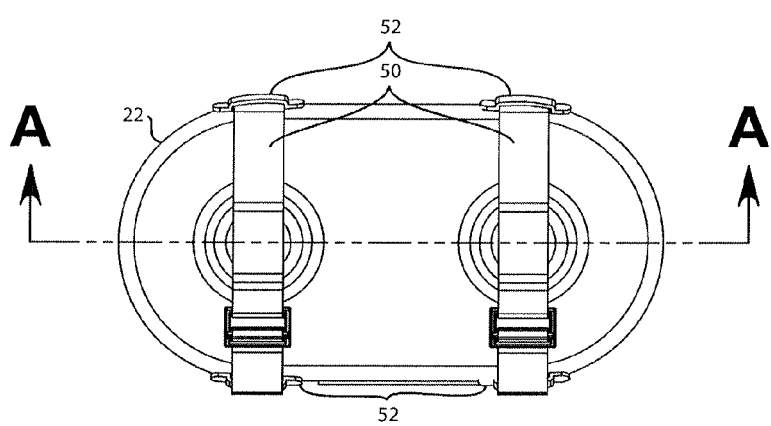

CEMENT BLOCK MOLD

FIELD OF THE INVENTION

There is described a mold for use in forming cement building blocks.

BACKGROUND OF THE INVENTION

U.S. Pat. No. 788,481 (Lightner) and U.S. Pat. No. 789,996 (McCullough) disclose examples of cement block molds. There will hereinafter be described an alterative cement block mold configuration.

SUMMARY

There is provided a cement block mold which includes a base, a top cap and a flexible sidewall strip. The base has an upstanding peripheral sidewall with a single slotted engagement. The top cap has a downwardly extending peripheral sidewall with a single slotted engagement. The flexible sidewall strip has a first engagement at a first end and a second engagement at a second end. The sidewall strip is secured in position by bending the sidewall strip to form one of a circle or an oval, and then engaging the first engagement and the second engagement with the slotted engagement of the base, and then engaging the first engagement and the second engagement with the slotted engagement of the top cap.

The cement block mold described above provides a number of advantages. It can be laid flat to minimize storage space. It can be made from light weight materials. For example the proto-types had polymer plastic bases and top caps and the sidewall was made of a flexible metal, such as tin or aluminum. Once the cement block has set, the cement block mold can readily be removed from around the cement block by removing the top cap, removing the base and then peeling the sidewall strip from around the sidewall. The ability to peel the sidewall strip away is much quicker and easier than attempting to slide a cement block out of a mold having a continuous closed sidewall that is incapable of being placed in a linear orientation. If desired, a block liner can be placed against the sidewall strip at the time of pouring of the cement, to make peeling the sidewall strip away easier, once the cement block has set.

It is envisaged that the cement block mold described above can be used at cement plants to make small blocks out of left over cement. Between 4% and 8% of the cement sent for delivery from cement plants is returned to the cement plants and a commercial use must be found for that cement. Small blocks of this type can be used by consumers for retaining walls, fire pits, columns and posts, planters, wells, foundations, landscaping terracing, stairs, bank and soil stabilization, drainage ditch lining, water erosion defusing, and noise refraction walls, to name just a few potential uses.

It is preferred that a fill port be provided in the sidewall strip. This allows the mold to be filled when resting on its sidewall. If the top cap or base were to be left off during filling, critical support for the sidewall strip would be absent and interlock profiles would not be formed. If the fill port were to be positioned in either the top cap or the bottom cap, it would also interfere with the block interlock profiles. A large fill port occupies space required for interlock profiles and interlock profiles would have to be formed by grinding or chipping. A small fill port does not facilitate the entry of the cement into the mold.

The form of engagement can vary. In the proto-types that were built to demonstrate the concept, both the first engagement and the second engagement were in the form of a bent retainer that engages a slotted engagement in the upstanding peripheral sidewall of the base and a similar slotted engagement in the downwardly extending peripheral sidewall of the top cap. The bent retainer which forms the first engagement readily engages the slotted engagement and remains in position while the sidewall strip is rolled around and the bent retainer of the second engagement is inserted into the slotted engagement.

It would be undesirable for the top cap or the base to become detached from the sidewall strip as the cement block mold is being filled with cement. It is, therefore, preferred that straps be provided maintain the top cap and the base engaged with the sidewall strip. It is also preferred, that strap retainers be positioned on at least one of the top cap or the base to prevent lateral movement of the straps.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 5 is a perspective view of a second embodiment of cement block mold having an oval sidewall.

FIG. 6 is a top plan view of the cement block mold illustrated in FIG. 4.

FIG. 7 is a side elevation view, in section, of the cement block mold illustrated in FIG. 5, taken along section lines A-A of FIG. 6.

DETAILED DESCRIPTION

Figure 1:
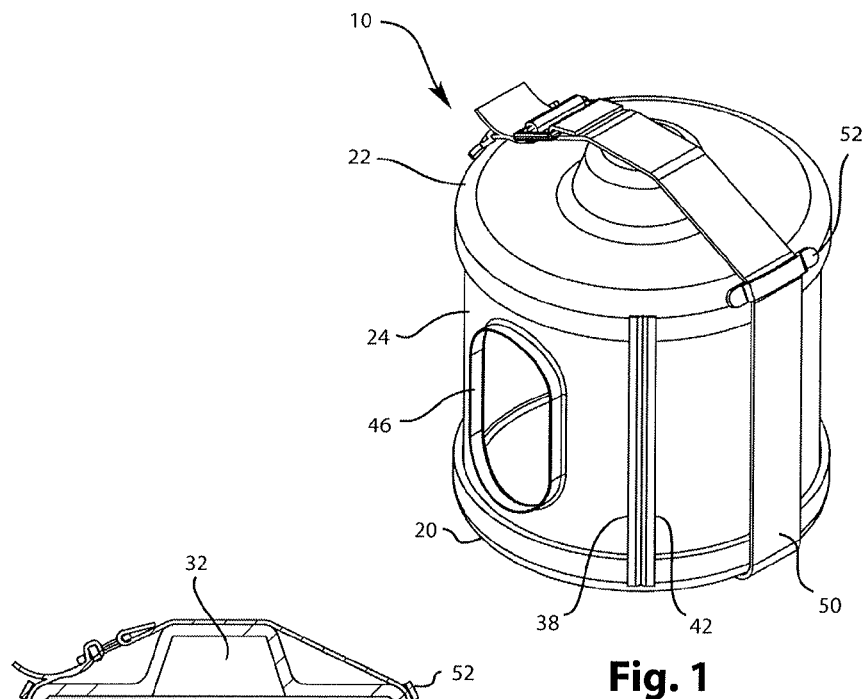
FIG. 1 is a perspective view of a first embodiment of cement block mold having a circular sidewall.

A first embodiment of cement block mold generally identified by reference numeral 10, will now be described with reference to FIG. 1 through 4. A second embodiment of cement block mold generally identified by reference numeral 100, will now be described with reference to FIG. 5 through 8. The only difference between cement block mold 10 and cement block mold 100 is their respective shapes. Cement block mold 10 has a circular sidewall and, as a consequence, makes blocks having a circular sidewall. Cement block mold 100 has an oval sidewall and, as a consequence, makes blocks having an oval sidewall. Common reference numerals will be used to describe the various features of cement block mold 10 and cement block mold 100.

Figure 3:
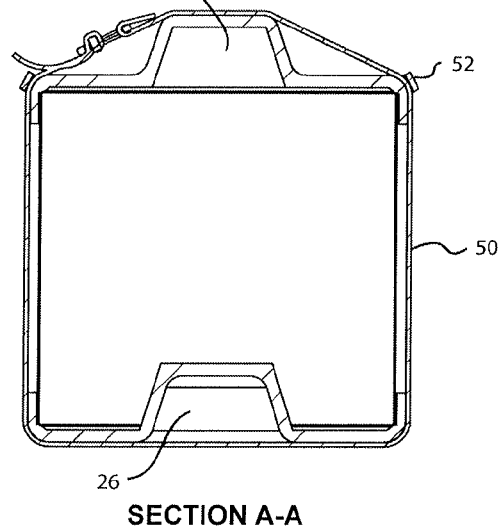
FIG. 3 is a side elevation view, in section, of the cement block mold illustrated in FIG. 1, taken along section lines A-A of FIG. 2.
Figure 2:
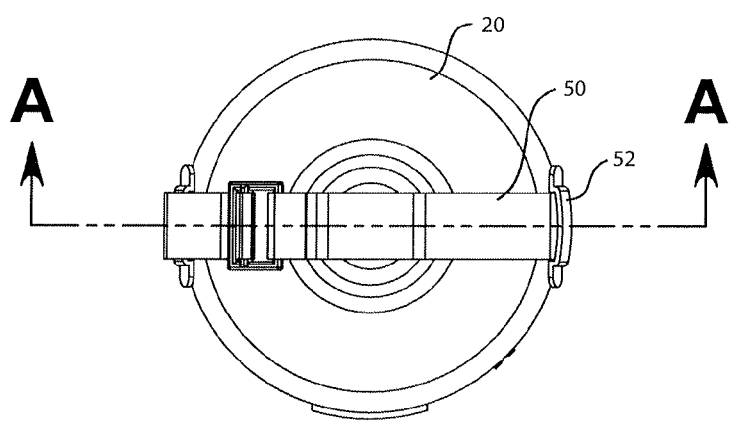
FIG. 2 is a top plan view of the cement block mold illustrated in FIG. 1.
Figure 4:
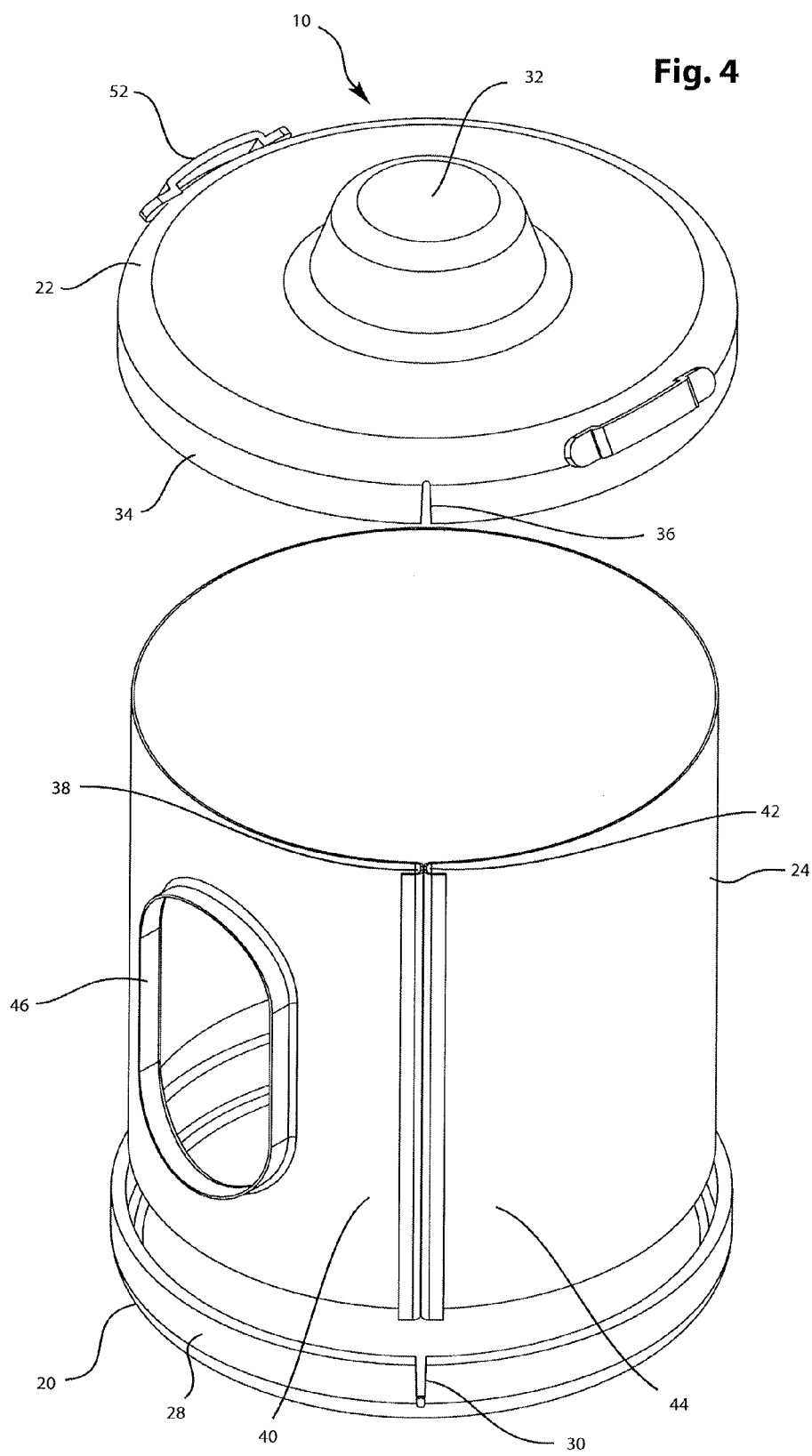
FIG. 4 is an exploded front elevation view of the cement block mold illustrated in FIG. 1.
Figure 8:
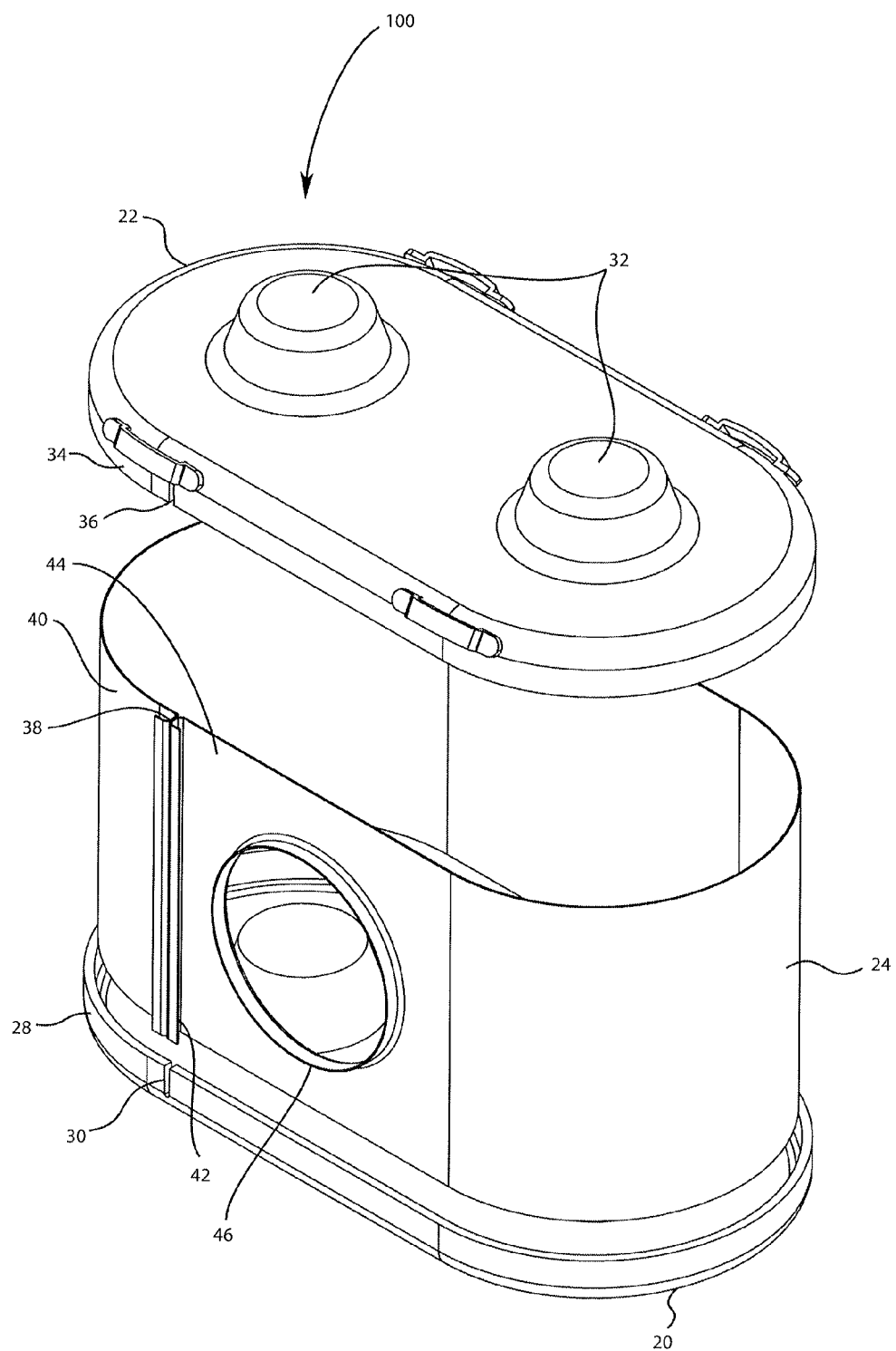
FIG. 8 is an exploded front elevation view of the cement block mold illustrated in FIG. 5.

Structure and Relationship of Parts:

Referring to FIG. 4 with respect to cement block mold 10 and FIG. 8 with respect to cement block 100, each cement block mold has three primary components, a base 20, a top cap 22 and a flexible sidewall strip 24. Referring to FIG. 3 with respect to cement block mold 10 and FIG. 7 with respect to cement block 100, base 20 defines a lower interlocking profile consisting of one or more female receptacles 26. Referring to FIG. 4 with respect to cement block mold 10 and FIG. 7 and FIG. 8 with respect to cement block 100, base 20 has an upstanding peripheral sidewall 28. Referring to FIG. 4 with respect to cement block mold 10 and FIG. 8 with respect to cement block 100, upstanding peripheral sidewall 28 of base 20 has a single slotted engagement 30. Referring to FIG. 3 with respect to cement block mold 10 and FIG. 7 with respect to cement block 100, top cap 22 defines an upper interlocking profile consisting of one or more male members 32. Referring to FIG. 4 with respect to cement block mold 10 and FIG. 7 and FIG. 8 with respect to cement block 100, top cap 22 has a downwardly extending peripheral sidewall 34. Referring to FIG. 4 with respect to cement block mold 10 and FIG. 8 with respect to cement block 100, peripheral sidewall 34 of top cap 22 has a single slotted engagement 36. Referring to FIG. 4 with respect to cement block mold 10 and FIG. 8 with respect to cement block 100, flexible sidewall strip 24 has a first engagement in the form of a first bent retainer 38 at a first end 40 and a second engagement in the form of a second bent retainer 42 at a second end 44. Referring to FIGS. 1 and 4 with respect to cement block mold 10 and FIGS. 5 and 8 with respect to cement block mold 100, the sidewall strip 24 is secured in position by bending sidewall strip 24 to form a circle for cement block mold 10 or an oval for cement block mold 100. First bent retainer 38 which serves as the first engagement and second bent retainer 42 which serves as the second engagement are then inserted into slotted engagement 30 of base 20. First bent retainer 38 which serves as the first engagement and second bent retainer 42 which serves as the second engagement are then inserted into slotted engagement 36 of top cap 22. Referring to FIG. 1 with respect to cement block mold 10 and FIG. 5 with respect to cement block mold 100, a fill port 46 is provided in sidewall strip 24. Each of cement block mold 10 and cement block mold 100 are filled while the mold is resting on its sidewall with fill port 46 facing upwardly. Referring to FIG. 3 with respect to cement block mold 10 and FIG. 7 with respect to cement block mold 100, when the mold is filled when resting on its sidewall it facilitates cement flowing into upper interlocking profile of male members 32.

Although there are a variety of materials that could be used, in successful prototypes built to prove the concept both base 20 and top cap 22 were made from polymer plastic. It is important that sidewall strip 24 be flexible. In successful proto-types built to prove the concept, sidewall strip was made from a flexible metal, more specifically aluminum.

Referring to FIG. 1 with respect to cement block mold 10 and FIG. 5 with respect to cement block mold 100, it is preferred that straps 50 be used to maintain top cap 22 and 20 base engaged with sidewall strip 24. This assists in preventing the components from separating when the cement block molds are resting on their sidewalls being filled with cement. Strap retainers 52 are positioned on one or both of top cap 22 or base 20 to prevent lateral movement of straps 50.

Operation:

It will be understood from the above description that the sequence of use is as follows. Referring to FIGS. 1 and 4 with respect to cement block mold 10 and FIGS. 5 and 8 with respect to cement block mold 100, the key components base 20, top cap 22 and flexible sidewall strip 24 are assembled. Assembly involves bending sidewall strip 24 to form a circle for cement block mold 10 or an oval for cement block mold 100. First bent retainer 38 which serves as the first engagement and second bent retainer 42 which serves as the second engagement are then inserted into slotted engagement 30 of base 20. First bent retainer 38 which serves as the first engagement and second bent retainer 42 which serves as the second engagement are then inserted into slotted engagement 36 of top cap 22. Referring to FIG. 1 with respect to cement block mold 10 and FIG. 5 with respect to cement block mold 100, straps 50 are cinched around the cement block molds used to prevent separation of the three key components base 20, top cap 22 and sidewall strip 24. Referring to FIG. 1 with respect to cement block mold 10 and FIG. 5 with respect to cement block mold 100, the molds are placed onto their sidewalls with fill port 46 facing upwardly. A cement, aggregate and water mixture is then poured into the molds through fill port 46 and left to set. Straps retainers 52 prevent straps 50 from moving laterally. Once the cement has set, straps 50, top cap 22 and base 20 are removed. Sidewall strip 24 is then peeled away and disengaged from the concrete block which has been formed.

Alternative Embodiments

Figure 9:
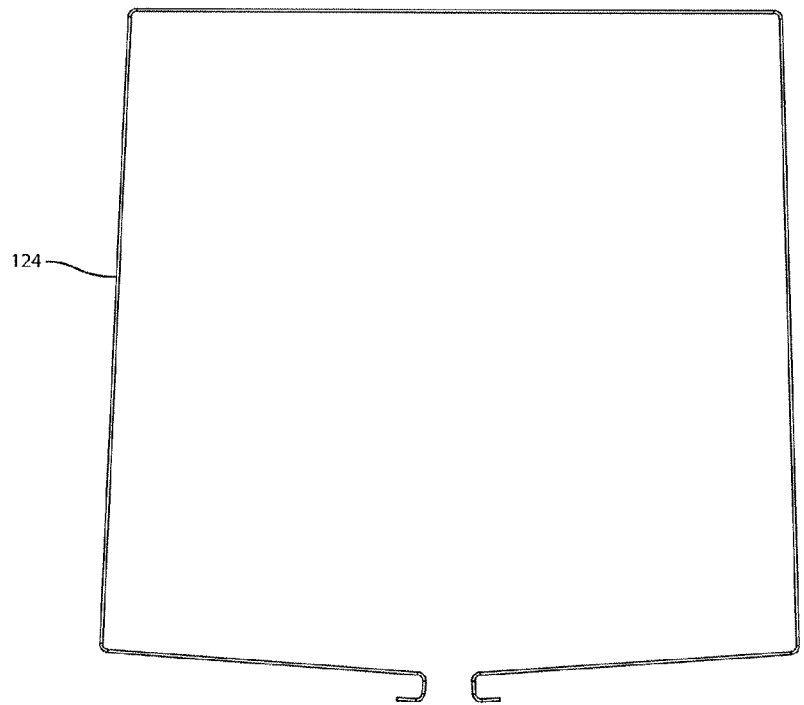
FIG. 9 is a top plan view of a four sided peripheral sidewall configuration.
Figure 10:
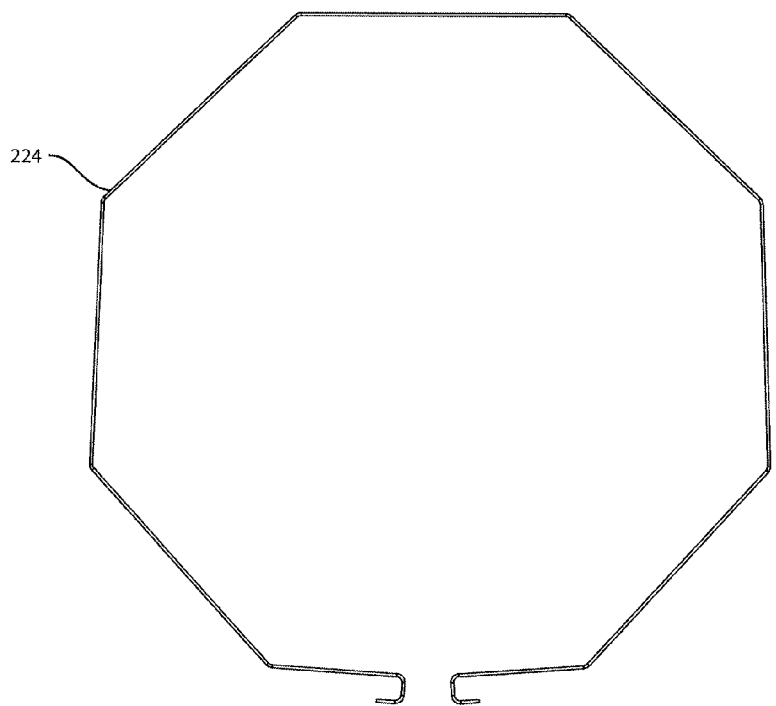
FIG. 10 is a top plan view of a multi-sided peripheral sidewall configuration.

There will now be described some alternative configurations. Cement block mold 10 illustrated in FIG. 1 through 4 and cement block mold 100 illustrated in FIG. 5 through 8 have been built and tested. Inquiries have been made and it has been confirmed that base 20 and top cap 22 can be molded out of plastic with upstanding peripheral sidewall 28 of base 20 and downwardly extending peripheral sidewall 34 of top cap 22 defining any desired multi-sided figure. After experimenting with flexible sidewall strip 24 it has been determined that multi-sided figures are viable. Referring to FIG. 9, there is illustrated a flexible sidewall strip, generally identified by reference numeral 124, in a square configuration. Referring to FIG. 10, there is illustrated a flexible sidewall strip, generally identified by reference numeral 224, in an octagon configuration. The octagon configuration has been arbitrarily selected to illustrate a multi-sided configuration.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A cement block mold, comprising:
   a base defining a lower interlocking profile and having an upstanding peripheral sidewall with a single slotted engagement;
   a top cap defining an upper interlocking profile and having a downwardly extending peripheral sidewall with a single slotted engagement;
   a flexible sidewall strip having a first engagement at a first end and a second engagement at a second end, the sidewall strip being secured in position by bending the sidewall strip to form one of a circle or an oval, engaging one of the first engagement or the second engagement with the slotted engagement of the base, and then engaging another of the first engagement or the second engagement with the slotted engagement of the top cap;
   strap retainers positioned on at least one of the top cap or the base, the strap retainers serving to prevent lateral movement of straps used to maintain the top cap and the base engaged with the sidewall strip; and a fill port in the sidewall strip, whereby the mold is filled when resting on its sidewall to facilitate cement flowing into the lower interlocking profile and the upper interlocking profile.

2. The cement block mold of claim 1, wherein the first engagement is a bent retainer that engages upstanding peripheral sidewall of the base or the downwardly extending peripheral sidewall of the top cap.

3. The cement block mold of claim 1, wherein the second engagement is a bent retainer that engages the upstanding peripheral sidewall of the base or the downwardly extending peripheral sidewall of the top cap.

4. The cement block mold of claim 1, wherein the base and the top cap are made from polymer plastic.

5. The cement block mold of claim 1, wherein the sidewall strip is made from a flexible metal.

\* \* \* \* \*